US012779458B2

(12) United States Patent
Fuchiwaki et al.

(10) Patent No.: US 12,779,458 B2
(45) Date of Patent: Nov. 3, 2026

(54) ASSAY DEVICE

(71) Applicant: NH FOODS LTD., Osaka (JP)

(72) Inventors: Yusuke Fuchiwaki, Takamatsu (JP); Masato Tanaka, Takamatsu (JP); Shohei Yamamura, Takamatsu (JP); Naoki Morishita, Tsukuba (JP); Seiichiro Matsuzaki, Tsukuba (JP)

(73) Assignee: NH FOODS LTD., Osaka (JP)

( * ) Notice: Subject to any disclaimer, the term of this patent is extended or adjusted under 35 U.S.C. 154(b) by 561 days.

(21) Appl. No.: 18/259,645

(22) PCT Filed: Dec. 27, 2021

(86) PCT No.: PCT/JP2021/048497
§ 371 (c)(1),
(2) Date: Jun. 28, 2023

(87) PCT Pub. No.: WO2022/149518
PCT Pub. Date: Jul. 14, 2022

(65) Prior Publication Data

US 2024/0342705 A1 Oct. 17, 2024

(30) Foreign Application Priority Data

Jan. 8, 2021 (JP) ................................ 2021-002111

(51) Int. Cl.
*B01L 3/00* (2006.01)
*G01N 35/08* (2006.01)

(52) U.S. Cl.
CPC ........ *B01L 3/502707* (2013.01); *G01N 35/08* (2013.01); *B01L 2300/048* (2013.01); *B01L 2300/069* (2013.01); *B01L 2300/0867* (2013.01)

(58) Field of Classification Search
CPC ......... B01L 3/502707; B01L 2300/048; B01L 2300/069; B01L 2300/0867;
(Continued)

(56) References Cited

U.S. PATENT DOCUMENTS

2013/0129580 A1 5/2013 Flavin et al.
2021/0170398 A1 6/2021 Fuchiwaki

FOREIGN PATENT DOCUMENTS

JP 2007170840 A * 7/2007
JP 2013524235 A 6/2013
(Continued)

OTHER PUBLICATIONS

English translation of JP2007170840.*
International Search Report corresponding to PCT/JP2021/048497; Date of Mailing: Feb. 22, 2022 (2 pages).

*Primary Examiner* — Charles Capozzi
*Assistant Examiner* — Michael Stanley Gzybowski
(74) *Attorney, Agent, or Firm* — Myers Bigel, P.A.

(57) ABSTRACT

An assay device allows reducing manufacturing variation, maintaining the measurement accuracy of the assay device at a high level, and enhancing the liquid control performance. The assay device of the present invention includes a microfluidic channel 2 allowing liquid to flow, an absorbing porous medium 3 disposed at a distance from one end **2*a* of the microfluidic channel 2, a separating space 4 disposed between the microfluidic channel 2 and the absorbing porous medium 3, and a housing space 5 housing the absorbing porous medium 3. The assay device further includes a lower member 20 which is an integrally molded article constituting a part of the assay device. The lower member 20 defines a lower portion 2*b* of the microfluidic channel 2, a lower portion 4*a* of the separating space 4, and a lower portion 5*a* of the housing space 5. The lower portions 4*a*, 5*a* of the separating space 4 and the housing space 5** are inclined
(Continued)

downward toward one side from the other side in a flow direction. The lower member 20 supports the absorbing porous medium 3 at the lower portion 5*a* of the housing space 5.

5 Claims, 7 Drawing Sheets

(58) Field of Classification Search
CPC ....... B01L 3/502723; B01L 2300/0816; B01L 3/5023; B01L 2400/0406; G01N 35/08; G01N 37/00
See application file for complete search history.

(56) References Cited

FOREIGN PATENT DOCUMENTS

| | | | |
|---|---|---|---|
| JP | 2019113460 | A | 7/2019 |
| WO | 2020045551 | A1 | 3/2020 |

* cited by examiner

ASSAY DEVICE

RELATED APPLICATIONS

This application is a 35 U.S.C. § 371 national stage application of PCT Application No. PCT/JP2021/048497, filed on Dec. 27, 2021, which claims priority from Japanese Patent Application No. 2021-002111, filed on Jan. 8, 2021, the contents of which are incorporated herein by reference in their entireties. The above-referenced PCT International Application was published in the Japanese language as International Publication No. WO 2022/149518 A1 on Jul. 14, 2022.

TECHNICAL FIELD

The present invention relates to an assay device configured to perform an assay using a liquid.

BACKGROUND ART

Primarily in the fields of biology, chemistry, and the like, assay devices including microfluidic channels have been employed for performing, for example, inspections, experiments, and assays using very small quantities of liquids such as reagents, processing agents, and the like on the order of a μl (1 microliter), that is to say, in the range from approximately 1 μl or greater to less than approximately 1 ml (milliliter). As such assay devices, an assay device of the lateral flow type, an assay device of the flow through type, and the like have recently been used for the purpose of reducing costs, improving operability, durability, and liquid control performance, and the like.

In particular, the assay device of the lateral flow type is simply configured to move and operate the liquid using capillary phenomena of hydrophilic porous media, such as paper, cellulose membranes, and the like. The assay device of the lateral flow type may be produced at low cost, requiring no external mechanisms, such as pumps and the like, and no complicated operations, allowing improvement in durability. The assay device of the lateral flow type is employed for detecting or quantifying the concentration of antibodies or antigens contained in a sample through the ELISA (Enzyme-Linked Immuno Sorbent Assay) process, immunochromatography, and the like, in particular. Such an assay device is required to improve the liquid control performance.

In an exemplary case of the assay device that can improve the liquid control performance, the assay device includes a microfluidic channel configured to allow liquid to flow, a porous medium disposed at a distance from one end of the microfluidic channel, the one end being positioned on one side in a flow direction of the liquid, a separating space disposed between the one end of the microfluidic channel and the porous medium, and a circumferential wall defining the separating space in cooperation with the porous medium. The circumferential wall is provided with a vent hole configured to allow air circulation. The liquid supplied through the microfluidic channel is divided by the separating space into a part absorbed by the porous medium, and another part detained in the microfluidic channel. In this exemplary case, the assay device is configured using a layered structure including a plurality of layer members (for example, see Patent Document 1).

CITATION LIST

Patent Literature

Patent Document 1: WO 2020/045551 A

SUMMARY OF INVENTION

Problem to be Solved by the Invention

In the exemplary case of the assay device, since the layered structure is formed by layering the layer members, it is difficult to improve the shape accuracy thereof. In particular, when a large number of assay devices are manufactured, manufacturing variation in these assay devices becomes large. Also, in the exemplary case of the assay device, a part constituted of the layer members has low stiffness and is thus easily deformed.

For example, in a case in which a member of the assay device, such as the porous medium, is supported by the part constituted of the layer members, deformation of the part may cause the member such as the porous medium to shift, especially in the liquid flow direction along the microfluidic channel. As a result, the accuracy of positioning the member such as the porous medium may be reduced. Thus, in the example of the assay device, the measurement accuracy of the assay device may not be maintained at a high level. In view of such circumstances, the assay device is required to reduce the manufacturing variation, maintain the measurement accuracy of the assay device at a high level, and improve the liquid control performance.

Means for Solving the Problems

To solve the problem, the assay device according to an aspect includes a microfluidic channel configured to allow liquid to flow; an absorbing porous medium disposed at a distance from one end of the microfluidic channel, the one end being positioned on one side in a flow direction of the liquid; a separating space disposed between the one end of the microfluidic channel and the absorbing porous medium; and a housing space connected to the separating space in the flow direction, the housing space housing the absorbing porous medium, wherein, the assay device includes a lower member being an integrally molded article, the lower member being positioned on a lower side of the assay device in a height direction and constituting a part of the assay device, the lower member defines a lower portion of the microfluidic channel in the height direction, a lower portion of the separating space in the height direction, and a lower portion of the housing space in the height direction, the lower portion of the separating space and the lower portion of the housing space are inclined downward toward the one side from another side in the flow direction of the liquid, and the lower member supports the absorbing porous medium at the lower portion of the housing space.

Advantageous Effects of Invention

In the assay device according to an aspect, it is possible to reduce manufacturing variation, maintain measurement accuracy of the assay device at a high level, and improve liquid control performance.

MODE FOR CARRYING OUT THE INVENTION

Figure 1:
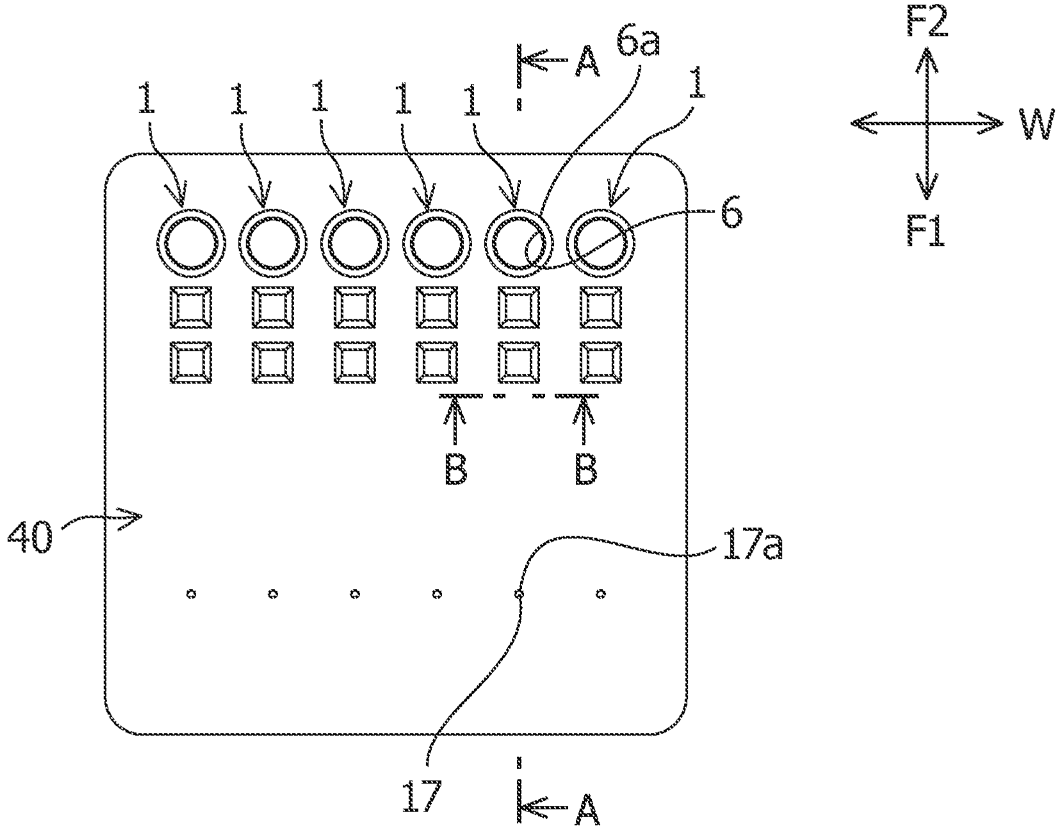
FIG. 1 is a schematic plan view showing an assay device according to an embodiment.
Figure 2:
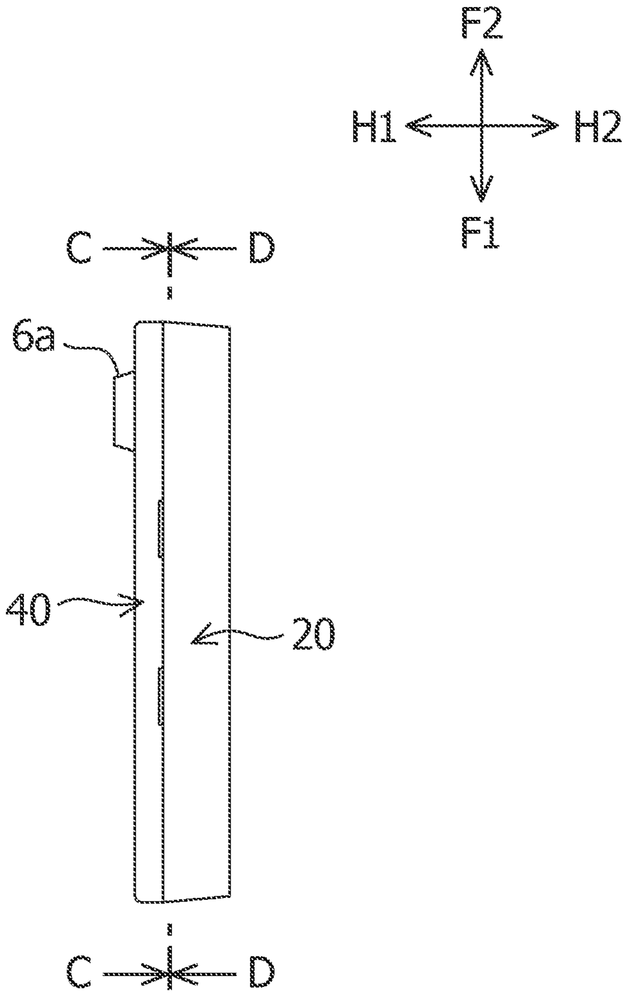
FIG. 2 is a schematic side view showing the assay device according to the embodiment.

An assay device according to an embodiment will be described. The assay device according to the embodiment is configured to perform an assay using a liquid. The liquid applicable to the assay device according to the embodiment is not specifically restricted so long as it is allowed to flow in the assay device. The liquid applicable to the assay device may not only be produced as chemically pure liquid, but may also be produced by dissolving, dispersing, or suspending gas, another liquid, or solid in the liquid.

The liquid may be hydrophilic. Examples of the hydrophilic liquid include liquid samples derived from an organism, such as whole blood, serum, blood plasma, blood cells, urine, diluted solution of feces, saliva, sweat, tears, nail extract, skin extract, hair extract, cerebrospinal fluid, and/or the like of humans or animals. In a case in which the liquid is a reagent used in an assay, examples of the liquid include buffer solution, general biochemical reagents, immunochemistry-related reagents, antibody-related reagents, peptide solution, protein/enzyme-related reagents, cell-related reagents, lipid-related reagents, natural product/organic compound-related reagents, and carbohydrate-related reagents. However, the liquid is not limited to these examples. The use of these samples or reagents allows the assay device to effectively clinically, diagnostically, or analytically measure a specimen in the liquid sample for the purpose of in-vitro diagnostic agents, over-the-counter test kits, point-of-care testing (POCT) and/or the like for testing for pregnancy, urine, feces, adult diseases, allergies, infectious diseases, drugs, cancer, and/or the like. However, the application purpose of the assay device is not limited to any particular purpose. The hydrophilic liquid is not limited to biological samples. Suspensions of food, food extracts, cleaning solutions for manufacturing lines, wiping solutions, drinking water, river water, soil-derived suspended solids, and/or the like may be used as the hydrophilic liquid. The use of such liquid allows the assay device to measure pathogens contained in food and drinking water, or contaminants in the river water and the soil. These hydrophilic liquids may typically contain water as a solvent and may be aqueous solutions that can be solution-exchanged by the assay device.

In the specification, the “lateral flow” denotes the flow of liquid moved by gravitational sedimentation as the drive force. The movement of liquid based on the lateral flow denotes the liquid movement dominantly (prevailingly) caused by the liquid drive force generated by gravitational sedimentation. The movement of the liquid based on capillary force (capillary phenomenon) denotes the liquid movement predominantly (prevailingly) caused by interfacial tension. The liquid movement based on lateral flow differs from the liquid movement based on capillary force.

In the specification, the “specimen” denotes the chemical compound or composition that is present in the liquid and to be detected or measured. For example, the specimen may be saccharides (for example, glucose), proteins or peptides (for example, serum proteins, hormones, enzymes, immunoregulatory factors, lymphokines, monokines, cytokines, glycoproteins, vaccine antigens, antibodies, growth factors, or proliferation factors), fats, amino acids, nucleic acids, cells, steroids, vitamins, pathogens or antigens thereof, natural substances or synthetic chemicals, contaminants, medicines for therapeutic purpose or illegal drugs, poisonous substances, metabolites of these substances, or those containing antibodies. However, the specimen is not limited to any particular specimen. The liquid may not contain the specimen, or may not contain the specimen in a detectable amount.

In the specification, the “reference substance” is a known substance that is different from the specimen and added in a known amount to the liquid for the detection of specimen concentration. The reference substance may be selected from the above-mentioned options similar to the specimen and may be selected in relation to the specimen. In particular, the reference substance may be selected from stable substances that do not interact with the specimen.

In the specification, the “microfluidic channel” denotes a path configured to allow the liquid to flow in the assay device in order to detect or measure the specimen using a very small amount of liquid on the order of a μl (1 microliter), that is to say, in the range from approximately 0.1 μl or greater to less than approximately 1 ml (milliliter), or in order to weigh a small amount of liquid.

In the specification, the “film” denotes the membranous substance or tabular substance with thickness of approximately 200 μm (micrometer) or less, and the “sheet” denotes the membranous substance or tabular substance with thickness in excess of approximately 200 μm.

In the specification, the “plastic” denotes the polymerized or shaped material to be produced using polymerizable or polymer material as an essential component. The plastic includes polymer alloys formed by combining two or more kinds of polymers.

In the specification, the “porous medium” may be a member having many micropores, which allows absorption and passage of the liquid therethrough or a member that can capture or concentrate solids, and denotes a member such as paper, cellulose membranes, non-woven fabric, glass fiber, polymer gel, plastics, and/or the like. For example, the porous medium may exhibit a hydrophilic property corresponding to a hydrophilic liquid, and exhibit a hydrophobic property corresponding to a hydrophobic liquid. In particular, the porous medium may exhibit the hydrophilic property, and may be formed as paper containing many fibers, absorbent cotton, and/or the like. Furthermore, the porous medium may be formed as any one or more selected from the cellulose, cellulose nitrate, cellulose acetate, filter paper, tissue paper, toilet paper, paper towel, fabric, cotton, or a hydrophilic porous polymer through which water can pass.

[Overview of Assay Device]

Referring to FIGS. 1 to 7, an overview of the assay device according to the embodiment will be described. The assay device according to the embodiment is schematically configured as described below. As shown in FIGS. 1 to 7, the assay device includes at least one assay module 1 configured to perform an assay using the liquid (not shown).

In particular, FIGS. 1, 3, and 5 to 7 show the assay device including six assay modules 1 as an example. However, the number of assay modules is not limited to six. The assay device may include one to five or seven or more assay modules.

As shown in FIGS. 4 to 7, the assay module 1 includes a microfluidic channel 2 configured to allow liquid to flow. In the following description, the direction along the liquid flow in the microfluidic channel 2 will be referred to as a "flow direction".

In FIGS. 1 to 4, 6, and 7, one side in the flow direction of the liquid is indicated by a one-way arrow F1, and the other side in the flow direction of the liquid is indicated by a one-way arrow F2. In the embodiment, the liquid flows toward one side of the microfluidic channel 2 from the other side. Thus, the one side in the flow direction may be referred to as a downstream side, and the other side in the flow direction may be referred to as an upstream side.

Figure 4:
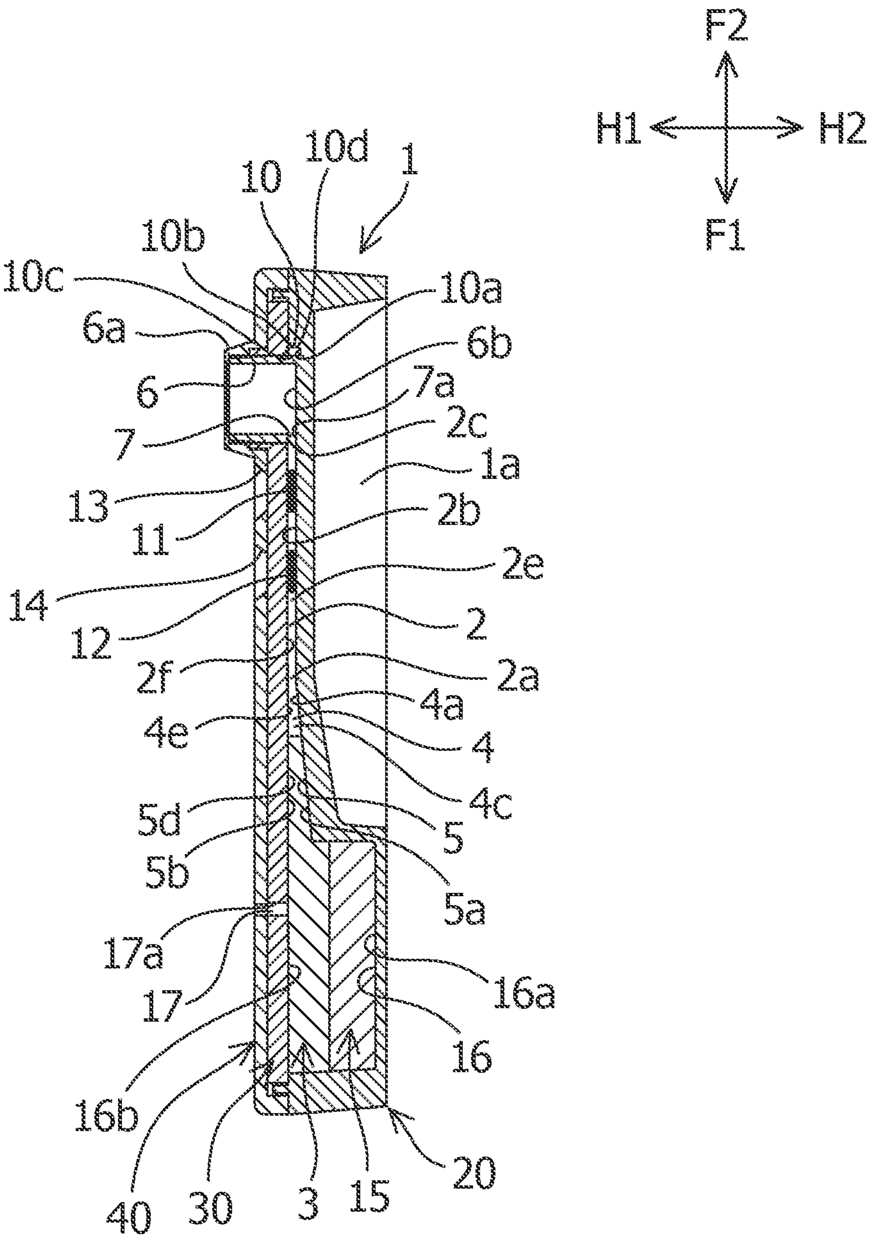
FIG. 4 is a schematic enlarged sectional view showing the assay device according to the embodiment, the view being taken along line A-A of FIG. 1.
Figure 6:
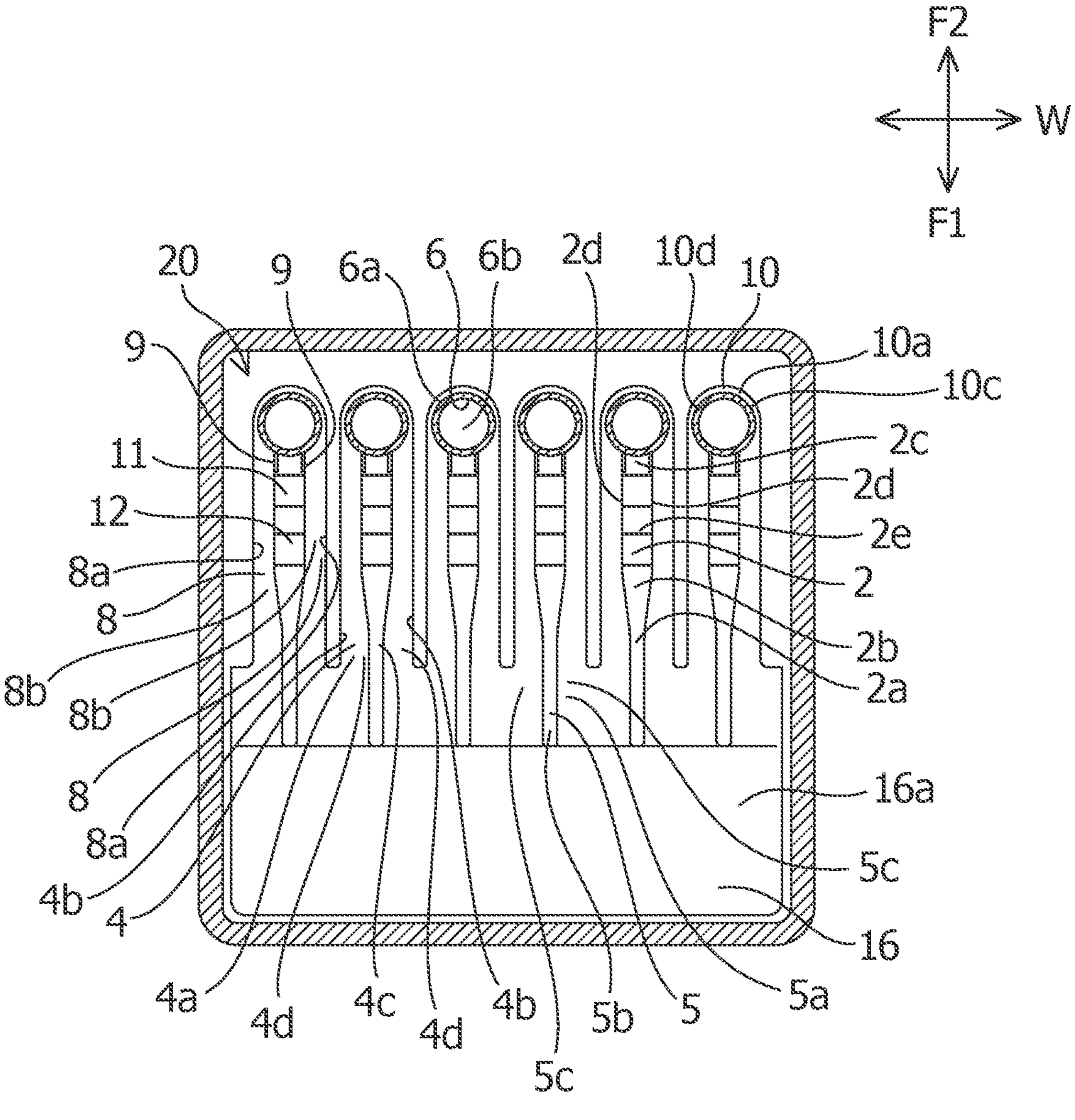
FIG. 6 is a schematic enlarged sectional view showing the assay device according to the embodiment with first and second absorbing porous media omitted, the view being taken along line C-C of FIG. 2.
Figure 7:
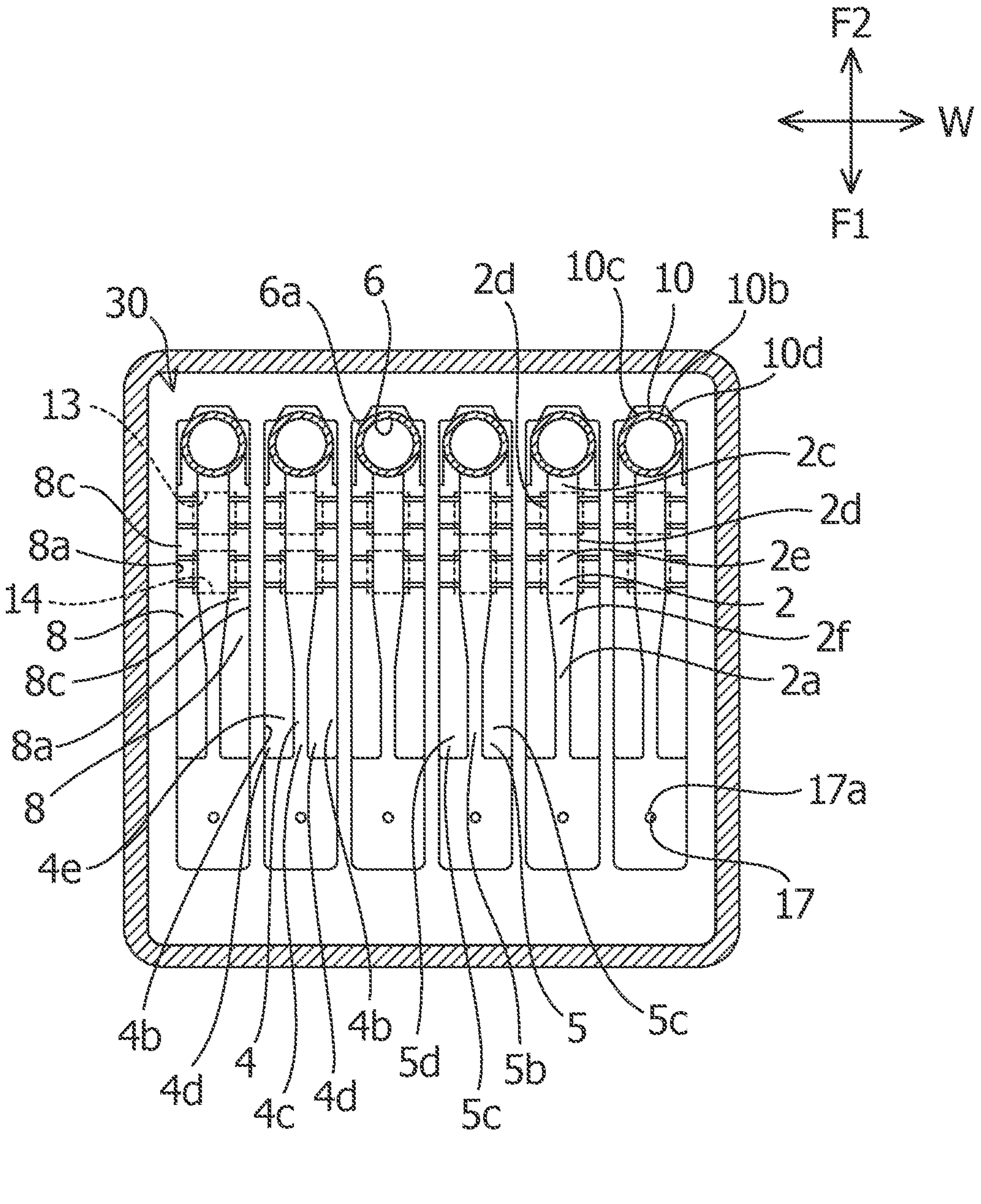
FIG. 7 is a schematic enlarged sectional view showing the assay device according to the embodiment with the first and second absorbing porous media omitted, the view being taken along line D-D of FIG. 2.

As shown in FIGS. 4, 6, and 7, the assay module 1 includes an absorbing porous medium 3 disposed at a distance from one end 2*a* of the microfluidic channel 2, the one end 2*a* being positioned on the one side, that is, the downstream side in the flow direction of the liquid. In the following description, the absorbing porous medium 3 is referred to as the first absorbing porous medium 3 as needed.

The assay module 1 includes a separating space 4 disposed between the one end 2*a* of the microfluidic channel 2 and the absorbing porous medium 3. The assay module 1 includes a housing space 5 housing the absorbing porous medium 3. The housing space 5 is connected to the separating space 4 in the flow direction. In the following description, the housing space 5 is referred to as the first housing space 5 as needed.

As shown in FIGS. 1 to 6, the assay device includes a lower member 20 positioned at the lower side in the height direction. The lower member 20 is a constituent member constituting a part of the assay device. The lower member 20 is an integrally molded article. In FIGS. 2 to 5, the upper side of the assay device in the height direction is indicated by a one-way arrow H1, and the lower side of the assay device in the height direction is indicated by a one-way arrow H2. In the specification, the height direction denotes the height direction of the assay device unless otherwise specified.

Figure 3:
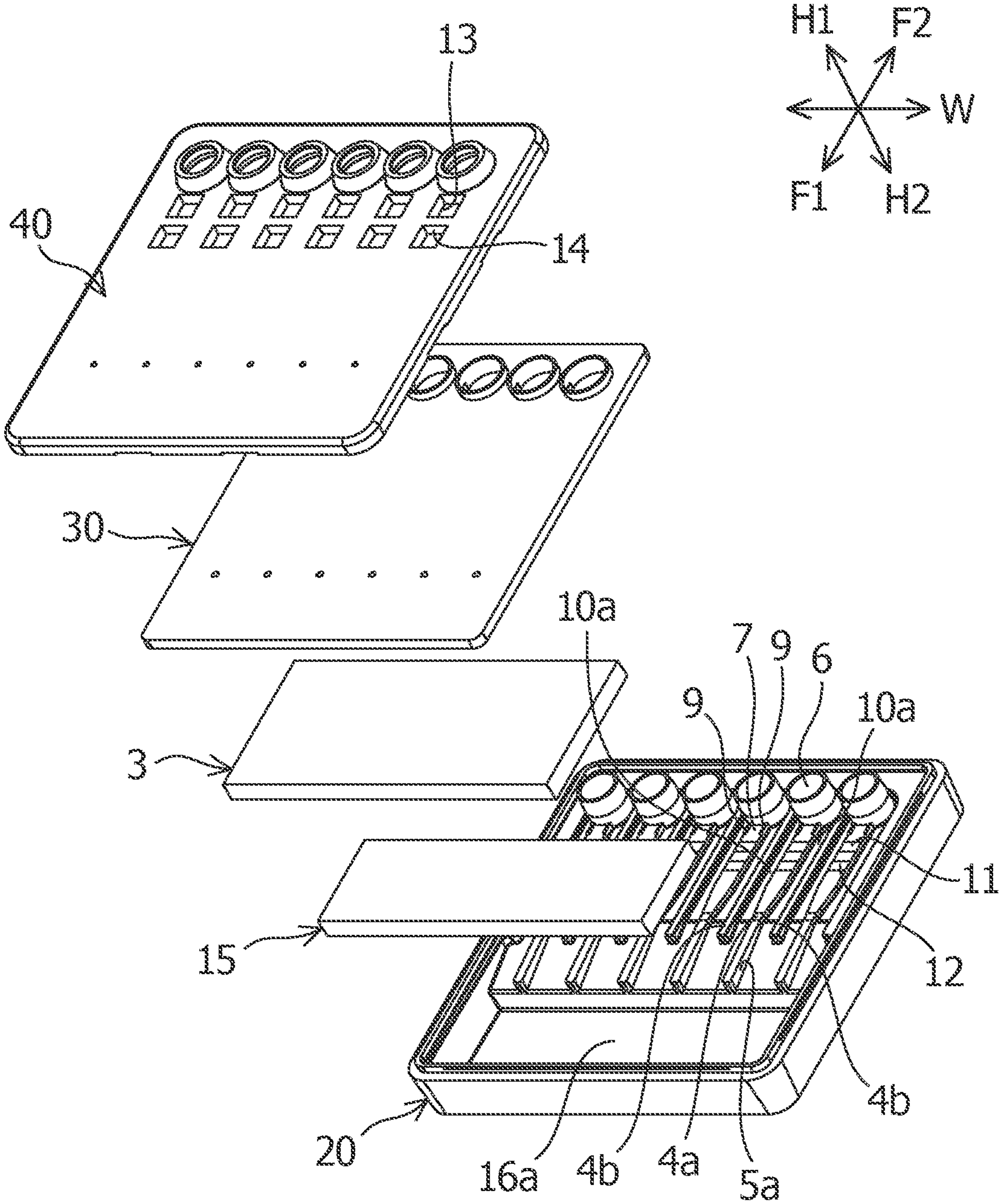
FIG. 3 is a schematic exploded perspective view showing the assay device according to the embodiment.
Figure 5:
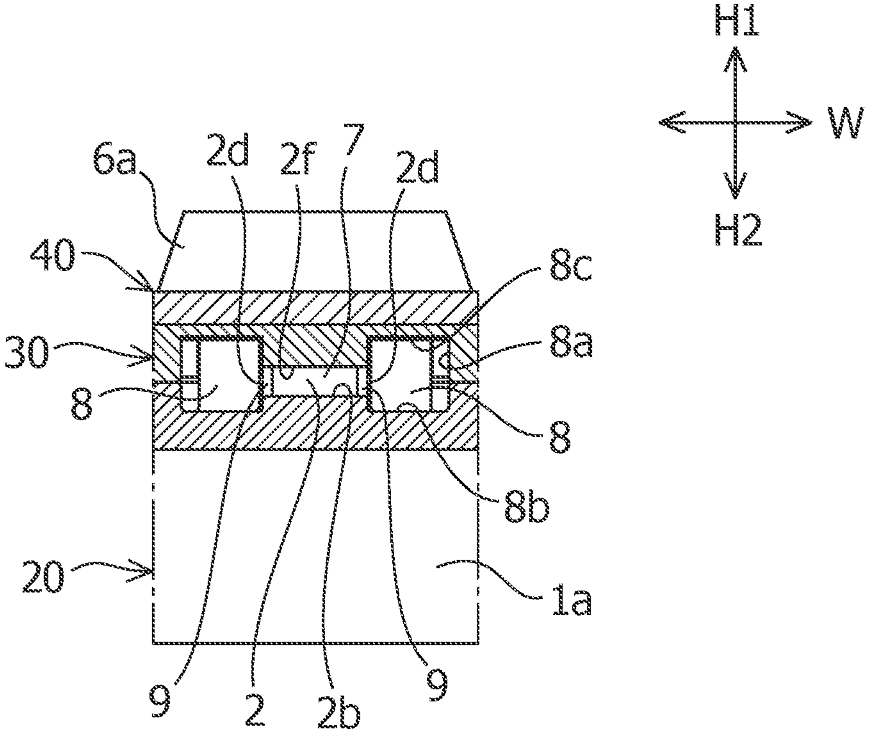
FIG. 5 is a schematic enlarged sectional view showing the assay device according to the embodiment, the view being taken along line B-B of FIG. 1.

Referring to FIGS. 4 to 6, the lower member 20 defines a lower portion 2*b* of the microfluidic channel 2 in the height direction. The lower member 20 defines a lower portion 4*a* of the separating space 4 in the height direction. The lower member 20 defines a lower portion 5*a* of the housing space 5 in the height direction. Referring to FIGS. 3 and 4, the lower portions 4*a*, 5*a* of the separating space 4 and the housing space 5 are inclined downward toward the one side from the other side in the flow direction of the liquid. As shown in FIG. 4, the lower member 20 supports the absorbing porous medium 3 at the lower portion 5*a* of the housing space 5.

The assay device according to the embodiment may be further schematically configured as described below. Referring to FIGS. 1, 3, 4, 6, and 7, the assay module 1 of the assay device includes an inlet 6 which allows liquid to be supplied to the microfluidic channel 2. The inlet 6 is disposed in the other end 2*c* of the microfluidic channel 2, which is positioned on the other side in the flow direction, that is, the upstream end 2*c*. The assay module 1 includes an inflow channel 7 which allows the microfluidic channel 2 and the inlet 6 to communicate with each other in the flow direction. The lower member 20 defines a circumferential edge portion 6*a* of the inlet 6. The inflow channel 7 is formed to penetrate through the circumferential edge portion 6*a* of the inlet 6.

As shown in FIGS. 5 to 7, the assay module 1 includes two parallel ventilation passages 8 which allow air circulation. Each of the two parallel ventilation passages 8 is adjacent to one of the two side edges 2*d* of the microfluidic channel 2 in the width direction to communicate with the microfluidic channel 2. Referring to FIGS. 3 to 7, the assay module 1 includes two passage side walls 9, each of the two passage side walls 9 protruding along a part of one of the two side edges 2*d* of the microfluidic channel 2 from the circumferential edge portion 6*a* of the inlet 6 in the flow direction. The lower member 20 defines the two passage side walls 9. The height of the two passage side walls 9 substantially coincides with the height of the microfluidic channel 2.

The lower member 20 also defines outer side portions 8*a* of the two parallel ventilation passages 8 in the width direction and both outer side portions 4*b* of the separating space 4 in the width direction. In FIGS. 1, 3, and 5 to 7, the width direction of the assay device is indicated by a two-way arrow W. In the specification, the width direction denotes the width direction of the assay device unless otherwise specified.

[Details of Assay Device]

Referring to FIGS. 1 to 7, the assay device according to the embodiment may be specifically configured as described below. As shown in FIGS. 1 to 7, the assay device is configured to have the height direction vertically directed in the usage state. In this case, the upper side and the lower side of the assay device are directed upward and downward in the vertical direction, respectively.

Referring to FIGS. 3 to 7, in the assay module 1, an assay is performed with the liquid flowing in the microfluidic channel 2 or with the liquid standing still or temporarily stopped in the microfluidic channel 2. Typically, the specimen concentration in the liquid can be detected. In particular, as shown in FIGS. 1, 3, and 5 to 7, in a case in which the assay device includes a plurality of assay modules 1, the assay modules 1 are arranged in the width direction.

As shown in FIGS. 5 to 7, the assay module 1 includes a connecting ventilation passage 10 which connects the two parallel ventilation passages 8 and extends around the circumference of the inlet 6. The connecting ventilation passage 10 is configured to allow air circulation. The air circulates through the two parallel ventilation passages 8 and the connecting ventilation passage 10, which are continuously connected to each other.

As shown in FIGS. 3, 4, and 6, the assay module 1 includes an assay region 11 positioned in an intermediate section 2*e* of the microfluidic channel 2 in the flow direction. A reagent that specifically binds to the specimen in an assay is immobilized in the assay region 11. The assay module 1 includes a confirmation region 12 disposed in such a manner that the assay region 11 and the confirmation region 12 are arranged in the flow direction. The confirmation region 12 is positioned downstream of the assay region 11.

The assay region 11 and the confirmation region 12 are apart from each other far enough to distinguish and detect signals generated in these regions. The confirmation region 12 is configured to allow the occurrence of a known reaction (second reaction) that can be regarded as having the same reaction time as a reaction (first reaction) that occurs in the assay region 11. The assay module 1 includes an assay window portion 13 and a confirmation window portion 14 formed to allow the assay region 11 and the confirmation region 12 to be visually checked from the outside thereof, respectively.

The assay module 1 includes a second absorbing porous medium 15 in contact with the first absorbing porous medium 3 in the height direction. The assay module 1 includes a second housing space 16 capable of housing the second absorbing porous medium 15. The assay module 1 includes a ventilation hole 17 formed to allow air circulation between the second housing space 16 and the outside of the assay device. Referring to FIGS. 4 to 7, the microfluidic channel 2, the separating space 4, the first housing space 5, the inlet 6, the inflow channel 7, the parallel ventilation passages 8, the connecting ventilation passage 10, the second housing space 16, and the ventilation hole 17 are spaces defined in the assay device.

Referring to FIGS. 1 to 5, and 7, the assay device includes an upper member 30 as a constituent member thereof. The upper member 30 is positioned above the lower member 20 in the height direction and constitutes a part of the assay device. The upper member 30 is an integrally molded article. The upper member 30 overlaps the lower member 20 from above.

The assay device includes a cover member 40 as a constituent member thereof. The cover member 40 is positioned above the upper member 30 in the height direction and constitutes a part of the assay device. The cover member 40 is an integrally molded article. The cover member 40 overlaps the upper member 30 from above.

[Details of Microfluidic channel]

Referring to FIGS. 4 to 7, the microfluidic channel 2 may be specifically configured as described below. As shown in FIGS. 4 and 5, the microfluidic channel 2 is defined in the height direction between an upper portion 2*f* and a lower portion 2*b* of the microfluidic channel 2 in the height direction. The height of the microfluidic channel 2 is determined to generate the interfacial tension of the liquid to prevent leakage of the liquid flowing in the microfluidic channel 2 to the parallel ventilation passages 8. For example, the height of the microfluidic channel 2 is preferably in the range from approximately 1 μm to approximately 1000 μm (that is, approximately 1 mm (millimeter)) inclusive. The height of the microfluidic channel is not limited to the abovementioned values.

Hydrophilization treatments may be preferably applied to the respective surfaces of the upper portion 2*f* and the lower portion 2*b* of the microfluidic channel 2, which come into contact with the liquid. The hydrophilization treatment may be the optical treatment using plasma or the like, or the treatment using the blocking agent capable of preventing the non-specific conjugate contained in the liquid, if any, from being adsorbed by these surfaces, or may include at least one of the abovementioned treatments. It is possible to use commercial blocking agents, such as Block Ace, bovine serum albumin, casein, skim milk, gelatin, surfactants, polyvinyl alcohol, globulin, serum (for example, fetal bovine serum or normal rabbit serum), ethanol, MPC polymer and/or the like as the blocking agent. It is possible to use a single kind of blocking agent, or a mixture of two or more kinds of blocking agents.

As shown in FIGS. 6 and 7, the microfluidic channel 2 is defined between the side edges 2*d* of the microfluidic channel 2 in the width direction. The downstream end 2*a* of the microfluidic channel 2 is formed in a tapered shape to have its width decreased toward the downstream side from the upstream side in the flow direction. In an example, the width of the microfluidic channel 2 may be preferably in the range from approximately 100 μm to approximately 10000 μm (that is, approximately 1 cm (centimeter)) inclusive. However, the width of the microfluidic channel is not limited to this range.

As shown in FIGS. 4, 6, and 7, the microfluidic channel 2 is defined between the separating space 4 and the inflow channel 7 in the flow direction. The microfluidic channel 2 substantially linearly extends in the flow direction. However, the microfluidic channel may extend in a curved or bent shape.

For example, the length of the microfluidic channel 2 in the flow direction may be preferably in the range from approximately 10 μm to approximately 10 cm inclusive. For example, the capacity of the microfluidic channel 2 may be preferably in the range from approximately 0.1 μl to approximately 1000 μl inclusive. More preferably, it may be in the range from approximately 1 μl or more to less than approximately 500 μl. The length in the flow direction and the capacity of the microfluidic channel are not limited to the abovementioned values.

[Details of Separating Space]

Referring to FIGS. 4 to 7, the separating space 4 may be specifically configured as described below. As shown in FIGS. 4, 6, and 7, the separating space 4 is connected to the microfluidic channel 2 and the two parallel ventilation passages 8, which are positioned upstream of the separating space 4 in the flow direction. The two outer side portions 4*b* of the separating space 4 are connected one-to-one to the outer side portions 8*a* of the two parallel ventilation passages 8 in the flow direction. A downstream end of the separating space 4, which is positioned on the downstream side in the flow direction, is defined by the first absorbing porous medium 3.

As shown in FIGS. 4 to 7, the separating space 4 includes a passage region 4*c* connected to the microfluidic channel 2 in the flow direction. The separating space 4 includes two ventilation regions 4*d* connected one-to-one to the two parallel ventilation passages 8 in the flow direction. Each of the two ventilation regions 4*d* is adjacent to one of the two side edges of the passage region 4*c* in the width direction. The two ventilation regions 4*d* communicate with the passage region 4*c* in the width direction. In the separating space 4, the upper end of the outer side portion 4*b* is positioned, in the height direction, above the upstream end of the passage region 4*c* in the flow direction. For example, the distance between the upper end of the outer side portion 4*b* and the upstream end of the passage region 4*c* in the height direction is approximately 5 mm. However, the distance is not limited to approximately 5 mm.

Referring to FIGS. 4 to 6, lower portions of the two ventilation regions 4*d* in the height direction are positioned, in the height direction, below a lower portion of the passage region 4*c* in the height direction. The lower portions of the two ventilation regions 4*d* are formed to be recessed downward in the height direction from the lower portion of the passage region 4*c*. The lower portion 4*a* of the separating space 4 includes the lower portions of the passage region 4*c* and the two ventilation regions 4*d*. Referring to FIGS. 3 and 4, each of the lower portions of the passage region 4*c* and the two ventilation regions 4*d* is inclined downward toward the downstream side from the upstream side in the flow direction. The inclination angle of each of the ventilation regions 4*d* with respect to the horizontal direction is greater than the inclination angle of the passage region 4*c* with respect to the horizontal direction. For example, the inclination angle of the passage region 4*c* of the separating space 4 with respect to the horizontal direction may be approximately 5 degrees. However, the inclination angle is not limited to approximately 5 degrees.

Referring to FIGS. 4, 5, and 7, upper portions of the two ventilation regions 4*d* in the height direction are positioned, in the height direction, above an upper portion of the passage region 4*c* in the height direction. The upper portions of the two ventilation regions 4*d* are formed to be recessed upward in the height direction from the upper portion of the passage region 4*c*. An upper portion 4*e* of the separating space 4 in the height direction includes the upper portions of the passage region 4*c* and the two ventilation regions 4*d*. The capacity of the separating space 4 is greater than the capacity of the microfluidic channel 2. However, the capacity of the separating space may be equal to or less than the capacity of the microfluidic channel. Hydrophilization treatments may be preferably applied to the respective surfaces of the upper portion and the lower portion of the passage region 4*c*, which come into contact with the liquid, as with the respective surfaces of the upper portion 2*f* and the lower portion 2*b* of the microfluidic channel 2.

In an example, the capacity of the separating space 4 may be preferably in the range from approximately 0.001 μl to approximately 10000 μl, inclusive. The ratio of the capacity of the separating space 4 to the capacity of the microfluidic channel 2 may be preferably approximately 0.01 or greater. However, the capacity of the separating space, and the ratio of the capacity of the separating space to the capacity of the microfluidic channel are not limited to the abovementioned values.

[Details of First and Second Absorbing Porous Media and First and Second Housing Spaces]

Referring to FIGS. 4, 6, and 7, the first and second absorbing porous media 3, 15 and the first and second housing spaces 5, 16 may be specifically configured as described below. The first absorbing porous medium 3 is configured to ensure absorption of the liquid from the one end 2*a* of the microfluidic channel 2. The first absorbing porous medium 3 is compressed between an upper portion 5*d* and the lower portion 5*a* of the first housing space 5. The first absorbing porous medium 3 is in contact with the outer side portion 4*b* of the separating space 4 in the flow direction.

The second absorbing porous medium 15 is configured to ensure absorption of the liquid of the first absorbing porous medium 3. As shown in FIG. 4, the second absorbing porous medium 15 is positioned below the first absorbing porous medium 3 in the height direction. The second absorbing porous medium may be positioned above the first absorbing porous medium in the height direction.

As shown in FIGS. 4, 6, and 7, the second housing space 16 is positioned downstream of the first housing space 5 in the flow direction. The second housing space 16 is connected to the first housing space 5 in the flow direction. The first housing space 5 is capable of housing an upstream part of the first absorbing porous medium 3 in the flow direction. The second housing space 16 is capable of housing a downstream part of the first absorbing porous medium 3 in the flow direction and the entirety of the second absorbing porous medium 15.

As shown in FIGS. 4, 6, and 7, the first housing space 5 includes a passage region 5*b* connected to the passage region 4*c* of the separating space 4 in the flow direction. The first housing space 5 includes two ventilation regions 5*c* connected one-to-one to the two ventilation regions 4*d* of the separating space 4 in the flow direction. Each of the two ventilation regions 5*c* is adjacent to each of the two side edges of the passage region 5*b* in the width direction. The two ventilation regions 5*c* communicate with the passage region 5*b* in the width direction.

Referring to FIGS. 4 and 6, lower portions of the two ventilation regions 5*c* in the height direction are positioned, in the height direction, below a lower portion of the passage region 5*b* in the height direction. The lower portions of the two ventilation regions 5*c* are formed to be recessed downward in the height direction from the lower portion of the passage region 5*b*. The lower portion 5*a* of the first housing space 5 includes the lower portions of the passage region 5*b* and the two ventilation regions 5*c*. Referring to FIGS. 3 and 4, each of the lower portions of the passage region 5*b* and the two ventilation regions 5*c* is inclined downward toward the downstream side from the upstream side in the flow direction. The inclination angle of each of the ventilation regions 5*c* with respect to the horizontal direction is larger than the inclination angle of the passage region 5*b* with respect to the horizontal direction. For example, the inclination angle of the passage region 5*b* of the first housing space 5 with respect to the horizontal direction may be approximately 5 degrees. However, the inclination angle is not limited to approximately 5 degrees.

Referring to FIGS. 4 and 7, upper portions of the two ventilation regions 5*c* in the height direction are positioned, in the height direction, above an upper portion of the passage region 5*b* in the height direction. The upper portions of the two ventilation regions 5*c* are formed to be recessed upward in the height direction from the upper portion of the passage region 5*b*. The upper portion 5*d* of the first housing space 5 in the height direction includes the upper portions of the passage region 5*b* and the two ventilation regions 5*c*.

Referring to FIGS. 3, 4, and 6, a lower portion 16*a* of the second housing space 16 in the height direction is formed in a recessed shape. Referring to FIGS. 4 and 7, an upper portion 16*b* of the second housing space 16 in the height direction is also formed in a recessed shape.

Referring to FIGS. 6 and 7, in a case in which the assay device includes a plurality of assay modules 1, the first housing spaces 5 of the assay modules 1 are arranged in the width direction. The first housing spaces 5 of the assay modules 1 may be connected to each other in the width direction. The second housing spaces 16 of the assay modules 1 are arranged in the width direction. The second housing spaces 16 of the assay modules 1 may be connected to each other in the width direction.

Referring to FIGS. 3, 6, and 7, the first absorbing porous media 3 housed in the first and second housing spaces 5, 16 may be integrally formed to be connected to each other in the width direction. The second absorbing porous media 15 housed in the second housing spaces 16 may also be integrally formed to be connected to each other in the width direction. The first and second absorbing porous media 3, 15 may be integrally formed.

[Details of Inlet and Inflow Passage]

Referring to FIG. 4, the inlet 6 and the inflow channel 7 may be specifically configured as described below. The inlet 6 is open to the outside of the assay device at the upper end in the height direction. A lower portion 6*b* of the inlet 6 in the height direction is connected, in the flow direction, to the lower portion 2*b* of the microfluidic channel 2 through a lower portion 7*a* of the inflow channel 7 in the height direction.

[Details of Parallel Ventilation Passages and Connecting Ventilation Passage]

Referring to FIGS. 4 to 7, the two parallel ventilation passages 8 and the connecting ventilation passage 10 may be specifically configured as described below. As shown in FIGS. 6 and 7, the two parallel ventilation passages 8 communicate with the microfluidic channel 2 in the width direction. Each of the two parallel ventilation passages 8 extends along one of the two side edges 2*d* of the microfluidic channel 2.

As shown in FIG. 5, the lower portion 8*b* of each of the two parallel ventilation passages 8 in the height direction is positioned, in the height direction, below the lower portion 2*b* of the microfluidic channel 2 in the height direction. The lower portion 8*b* of each of the two parallel ventilation passages 8 is formed to be recessed downward in the height direction from the lower portion 2*b* of the microfluidic channel 2. The upper portion 8*c* of each of the two parallel ventilation passages 8 in the height direction is positioned, in the height direction, above the upper portion 2*f* of the microfluidic channel 2 in the height direction. The upper portion 8*c* of each of the two parallel ventilation passages 8 is formed to be recessed upward in the height direction from the upper portion 2*f* of the microfluidic channel 2.

As shown in FIG. 4, a lower portion 10*a* of the connecting ventilation passage 10 in the height direction is positioned, in the height direction, below the lower portion 2*b* of the microfluidic channel 2 in the height direction. The lower portion 10*a* of the connecting ventilation passage 10 is formed to be recessed downward in the height direction from the lower portion 2*b* of the microfluidic channel 2. An upper portion 10*b* of the connecting ventilation passage 10 in the height direction is positioned, in the height direction, above the upper portion 2*f* of the microfluidic channel 2 in the height direction. The upper portion 10*b* of the connecting ventilation passage 10 is formed to be recessed upward in the height direction from the upper portion 2*f* of the microfluidic channel 2.

As shown in FIGS. 6 and 7, the width of the connecting ventilation passage 10 extending in a substantially U-like shape around the inlet 6 is determined by an inner circumferential portion 10*c* and an outer circumferential portion 10*d* of the connecting ventilation passage 10. The inner circumferential portion 10*c* of the connecting ventilation passage 10 is formed integral with the circumferential edge portion 6*a* of the inlet 6.

[Details of Assay and Confirmation Regions and Assay and Confirmation Window Portions]

Referring to FIG. 4, the assay and confirmation regions 11, 12 and the assay and confirmation window portions 13, 14 may be specifically configured as described below. Reagents in the assay region 11 involved in signal generation derived from the specimen and the reference substance, which may also be referred to as "assay reagents", include an immobilized reagent used to be previously immobilized in the microfluidic channel 2 and an additive reagent used to be added to the microfluidic channel 2 in the assay process.

The immobilized reagent provided in the assay region 11 specifically reacts with the specimen in the liquid and produces a result for making the specimen detectable in cooperation with the additive reagent. For example, the result for making the specimen detectable may be represented to be observable by the naked eye based on color changes and/or the like, or may be represented to make the specimen detectable only by a spectrometer or other measurement means.

The immobilized reagent provided in the assay region 11 may be enzymes, antibodies, epitopes, nucleic acids, cells, aptamers, peptides, molecular imprinted polymers, adsorption polymers, adsorption gels, chemicals such as iron (III) ions that change color upon reaction with the specimen, coloring reagents, or any other substances that produce detectable results upon reaction with the specimen. Typically, the immobilized reagent may be an antibody. The immobilized reagent may be immobilized in the assay region 11 by known immobilization techniques such as physical adsorption, chemisorption, and/or the like.

Any labeling substance such as radioisotopes, enzymes, gold colloids, coloring reagents, quantum dots, colored molecules such as latex, coloring agents, electrochemical reactants, fluorescent substances, luminous substances, and/or the like may bind to the immobilized reagent to analyze or amplify a detection signal. Alternatively, such a labeling substance may bind to the additive reagent used to be added to the microfluidic channel 2 in the assay process. Specifically, the immobilized reagent may be immobilized onto one or both of the upper portion 2*f* and the lower portion 2*b*, which define the microfluidic channel 2 in the height direction.

The immobilized reagent that specifically binds to the reference substance is provided in the confirmation region 12. The immobilized reagent in the confirmation region 12 may also be an antibody as with the immobilized reagent in the assay region 11. Any labeling substance may bind to the immobilized reagent. The immobilized reagent may also be immobilized onto one or both of the upper portion 2*f* and the lower portion 2*b*, which define the microfluidic channel 2 in the height direction.

The assay window portion 13 and the confirmation window portion 14 are disposed above the assay region 11 and the confirmation region 12 in the height direction, respectively. However, the assay window portion and the confirmation window portion may be disposed below the assay region and the confirmation region in the height direction, respectively.

[Details of Lower Member, Upper Member, and Cover Member]

Referring to FIGS. 1 to 7, the lower member 20, the upper member 30, and the cover member 40 may be specifically configured as described below. The lower member 20, the upper member 30, and the cover member 40 are injection-molded articles. However, at least one of the lower member, the upper member, and the cover member may be an article other than the injection-molded article. For example, at least one of the lower member, the upper member, and the cover member may be a three-dimensional shaped article, a machined article, and/or the like.

The lower member 20, the upper member 30, and the cover member 40 are made of plastics. Examples of the plastics include polyolefins (PO) such as polyethylene (PE), high density polyethylene (HDPE), and polypropylene (PP), ABS resins (ABS), AS resins (SAN), polyvinylidene chloride (PVDC), polystyrene (PS), polyethylene terephthalate (PET), polyvinyl chloride (PVC), nylon, polymethyl methacrylate (PMMA), cycloolefin copolymer (COC), cycloolefin polymer (COP), polycarbonate (PC), polydimethylsiloxane (PDMS), polyacrylonitrile (PAN), biodegradable plastics such as polylactic acid (PLA), other polymers, or combinations thereof. At least one of the lower member, the upper member, and the cover member can be produced using a material other than plastics as long as the material does not allow fluid infiltration. The material other than plastics may be resin, glass, metal, and/or the like.

Referring to FIGS. 3 to 6, the lower member 20 defines the lower portions 2*b* of the microfluidic channels 2, the lower portions 4*a* and the outer side portions 4*b* of the separating spaces 4, the lower portions 5*a* of the first housing spaces 5, the circumferential edge portions 6*a* and the lower portions 6*b* of the inlets 6 including the inflow channels 7, the outer side portions 8*a* and the lower portions 8*b* of the parallel ventilation passages 8, the passage side walls 9, the lower portions 10*a*, the inner circumferential portions 10*c*, and the outer circumferential portions 10*d* of the connecting ventilation passages 10, and the lower portions 16*a* of the second housing spaces 16 of the assay modules 1 in a continuous manner.

Each of the assay modules 1 includes a recessed portion 1*a* provided upstream of the second housing space 16 in the flow direction. The recessed portion 1*a* is formed to be recessed from a lower end face of the lower member 20. The recessed portion 1*a* is positioned below the microfluidic channel 2, the separating space 4, the first housing space 5, the inlet 6, the parallel ventilation passages 8, and the connecting ventilation passage 10 of each of the assay modules 1 in the height direction. The recessed portions 1*a* of the assay modules 1 are formed to be connected to each other in the width direction in the lower member 20.

Referring to FIGS. 3 to 5, and 7, the upper member 30 defines the upper portions 2*f* of the microfluidic channels 2, the upper portions 4*e* of the separating spaces 4, the upper portions 5*d* of the first housing spaces 5, the upper portions 8*c* of the parallel ventilation passages 8, the upper portions 10*b* of the connecting ventilation passages 10, the upper portions 16*b* of the second housing spaces 16, and circumferential edge portions 17*a* of the ventilation holes 17 of the assay modules 1 in a continuous manner. The upper member 30 is preferably transparent.

Referring to FIGS. 1 to 4, the cover member 40 also defines the circumferential edge portions 6*a* of the inlets 6, and the circumferential edge portions 17*a* of the ventilation holes 17 of the assay modules 1 in cooperation with the lower member 20. The ventilation hole 17 is formed to penetrate through the upper member 30 and the cover member 40. The assay window portion 13 and the confirmation window portion 14 are formed to penetrate through the cover member 40. The cover member 40 may be a detachable member of the assay device. Specifically, the cover member 40 may be detachably attached to an assembly of the lower member 20 and the upper member 30.

[Fluid Control in Assay Device]

Referring to FIGS. 4 to 7, an explanation will be made with respect to fluid control executed in the assay device according to the embodiment. Here, liquids applied to the assay device are referred to as first and second liquids (not shown). In the explanation, the first and second liquids will be supplied to the assay device in this order. The first liquid and the second liquid are different from each other. However, the first liquid and the second liquid may be the same.

Typically, each amount of the liquids (each amount of the first and the second liquids) supplied to the assay device may be equal to or greater than approximately 1 μl, and less than approximately 1 ml. Preferably, each amount of the liquids is equal to or greater than approximately 1.5 μl, and more preferably, approximately 3.0 μl or greater. The upper limit of each amount of the liquids may be, for example, in the range from several μl to several hundreds of μl. The determination of each amount of the liquids may stabilize the detection sensitivity of the specimen and facilitate the detection of the specimen and/or the like. In this case, each amount of the liquids may be obtained by a drop of the liquid.

Each amount of the liquids may be greater than the capacity of the microfluidic channel 2. In such a case, the liquid may be divided adequately by the separating space 4 into a part absorbed by the absorbing porous medium 3 and another part detained in the microfluidic channel 2. Each amount of the liquids may be made less than the capacity of the microfluidic channel, or substantially equivalent to that of the microfluidic channel.

First, the first liquid is supplied to the inlet 6. The first liquid then flows into the microfluidic channel 2 through the inflow port 7. The first liquid then flows in the microfluidic channel 2 from the upstream side to the downstream side in the flow direction. While the first liquid is flowing in the microfluidic channel 2 in this manner, an assay is performed in the assay region 11, and the known reaction (second reaction) that can be regarded as having the same reaction time as the reaction (first reaction) that occurs in the assay region 11 occurs in the confirmation region 12.

In a case in which supply of the first liquid is continued, in particular, supply of the first liquid by amount in excess of the capacity of the microfluidic channel 2, the first liquid flowing in the microfluidic channel 2 reaches the separating space 4. The first liquid comes in contact with the absorbing porous medium 3 after passing through the separating space 4. The first liquid is absorbed by the absorbing porous medium 3 until the supply of the liquid is stopped. After supply of the first liquid is stopped, the first liquid is divided by the separating space 4 into a part absorbed through the capillary force of the absorbing porous medium 3, and another part detained in the microfluidic channel 2.

After the supply of the first liquid is stopped, the second liquid is further supplied to the inlet 6. Similar to the first liquid, the supplied second liquid flows in the microfluidic channel 2. At this time, the second liquid extrudes the first liquid which has been preliminarily filled in the microfluidic channel 2 toward the separating space 4. As a result, solution exchange occurs in the microfluidic channel 2 by replacing the first liquid with the second liquid. While the second liquid is flowing in the microfluidic channel 2, an assay is performed in the assay region 11, and the known reaction (second reaction), which can be considered to have the same reaction time as the reaction (first reaction) that occurs in the assay region 11 occurs in the confirmation region 12.

In a case in which the supply of the second liquid is continued, in particular, the supply of the second liquid by an amount in excess of that of the first liquid which has been preliminarily filled in the microfluidic channel 2, the first liquid extruded by the second liquid first comes in contact with the absorbing porous medium 3 via the separating space 4. Thereafter, subsequent to the first liquid, the second liquid comes in contact with the absorbing porous medium 3 via the separating space 4. Similar to the first liquid, the second liquid then flows, and is divided by the separating space 4 into the part absorbed through the capillary force of the absorbing porous medium 3 and another part detained in the microfluidic channel 2.

The above described solution exchange allows the ELISA process or the like to easily generate multistage antigen-antibody reaction. The solution exchange may be securely executed, in particular, when making an amount of the second liquid L2 supplied to the assay device substantially equal to or greater than that of the first liquid which has been filled in the microfluidic channel 2.

In other words, in the assay device according to the embodiment, when supplying multiple kinds of liquid to the inlet 6 sequentially, the microfluidic channel 2 is preliminarily filled with the preceding one of the multiple kinds of liquid, and the supply of the preceding liquid is stopped. Subsequently, another one of the multiple kinds of liquid that is subsequent to the preceding liquid, is supplied to the inlet 6 so that the preceding liquid can be replaced with the subsequent liquid in the microfluidic channel 2.

The solution exchange for replacing the preceding liquid with the subsequent liquid may be executed repeatedly. In such a case, typically, the preceding liquid is different from the subsequent liquid. The preceding liquid may be the same as the subsequent liquid.

As described above, the assay device according to the embodiment includes the microfluidic channel 2 configured to allow liquid to flow, the absorbing porous medium 3 disposed at a distance from the one end 2*a* of the microfluidic channel 2, the one end 2*a* being positioned on one side in the flow direction of the liquid, the separating space 4 disposed between the one end 2*a* of the microfluidic channel 2 and the absorbing porous medium 3, and the housing space 5 connected to the separating space 4 in the flow direction, the housing space 5 housing the absorbing porous medium 3. The assay device further includes the lower member 20 which is an integrally molded article, the lower member 20 being positioned at the lower side of the assay device in the height direction and constituting a part of the assay device. The lower member 20 defines the lower portion 2*b* of the microfluidic channel 2 in the height direction, the lower portion 4*a* of the separating space 4 in the height direction, and the lower portion 5*a* of the housing space 5 in the height direction. The lower portions 4*a*, 5*a* of the separating space 4 and the housing space 5 are inclined downward toward the one side from the other side in the flow direction of the liquid. The lower member 20 supports the absorbing porous medium 3 at the lower portion 5*a* of the housing space 5.

In the assay device according to the embodiment, the liquid supplied through the microfluidic channel 2 can be divided by the separating space 4 into a part absorbed by the absorbing porous medium 3, and another part detained in the microfluidic channel 2. This makes it possible to improve the accuracy of measuring the liquid detained in the microfluidic channel 2 and also improve the liquid control performance. The lower member 20, which is the integrally molded article provided in the assay device, can be stably produced by injection molding using a mold, and/or the like. Thus, it is possible to increase the stiffness of the lower member 20, which is the integrally molded article, and reduce shape variation in the lower member 20.

Thus, the stiffness of the lower portions 2*b*, 4*a*, 5*a* of the microfluidic channel 2, the separating space 4, and the housing space 5 defined by the lower member 20 can be increased. As a result, it is possible to reduce the deformation of the microfluidic channel 2, the separating space 4, and the housing space 5 and reduce shape variation in the microfluidic channel 2, the separating space 4, and the housing space 5. In addition, since the absorbing porous medium 3 can be stably supported at the lower portion 5*a* of the housing space 5 in which the deformation can be reduced, misalignment of the absorbing porous medium 3 can be reduced. As a result, it is possible to improve the accuracy of positioning the absorbing porous medium 3.

Since it is possible to reduce the deformation of the microfluidic channel 2, the separating space 4, and the housing space 5 used in the measurement of the assay device and reduce the manufacturing variation in the passage and the spaces, it is possible to maintain the shape accuracy of the microfluidic channel 2, the separating space 4, and the housing space 5 and the accuracy of the measurement of the assay device performed using the passage and the spaces at a high level, and also improve the liquid control performance. Thus, in the assay device according to the embodiment, it is possible to reduce the manufacturing variation, maintain the measurement accuracy of the assay device at a high level, and also improve the liquid control performance.

The assay device according to the embodiment includes the inlet 6 disposed in the other end 2*c* of the microfluidic channel 2 on the other side in the flow direction, the inlet 6 allowing the liquid to be supplied to the microfluidic channel 2, and the inflow channel 7 allowing the microfluidic channel 2 and the inlet 6 to communicate with each other in the flow direction. The lower member 20 defines the circumferential edge portion 6*a* of the inlet 6. The inflow channel 7 is defined to penetrate through the circumferential edge portion 6*a* of the inlet 6 in the lower member 20.

In the assay device, the stiffness of the circumferential edge portion 6*a* of the inlet 6 defined by the lower member 20, which is an integrally molded article, can be increased. As a result, it is possible to reduce the deformation of the inlet 6 and the inflow channel 7 defined by the circumferential edge portion 6*a* and reduce the shape variation in the inlet 6 and the inflow channel 7. Thus, it is possible to maintain the shape accuracy of a path from the inlet 6 to the microfluidic channel 2 through the inflow channel 7, maintain the accuracy of the measurement of the assay device performed using the path at a high level, and also improve the liquid control performance.

The assay device according to the embodiment includes the two parallel ventilation passages 8, each of the two parallel ventilation passages 8 being adjacent to one of the two side edges 2*d* of the microfluidic channel 2 in the width direction, the two parallel ventilation passages 8 communicating with the microfluidic channel 2 to allow air circulation, the two passage side walls 9, each of the two passage side walls 9 protruding along a part of one of the two side edges 2*d* of the microfluidic channel 2 from the circumferential edge portion 6*a* of the inlet 6 in the flow direction. The lower member 20 defines the two passage side walls 9. The height of the two passage side walls 9 coincides with the height of the microfluidic channel 2.

In the assay device according to the embodiment, the liquid in the microfluidic channel 2 comes in contact with air in the parallel ventilation passages 8 in the width direction. This makes it possible to avoid contact of the liquid with the upper portion 2*f* and the lower portion 2*b*, which define the microfluidic channel 2 in the width direction. This may reduce the probability of non-specific adsorption of specimens, reagents, impurities and/or the like which adhere on the upper portion 2*f* and the lower portion 2*b*, and further reduce the risk of mixing of impurities adhering to the upper portion 2*f* and the lower portion 2*b* with the liquid. This may avoid the influence of the viscosity and the friction between the liquid in the microfluidic channel 2 and the upper portion 2*f* and the lower portion 2*b* that define the microfluidic channel 2 in the width direction.

It is possible to release an air gap generated in the liquid in the microfluidic channel 2 into the parallel ventilation passages 8. It is also possible to efficiently supply gas such as nitrogen and oxygen in the parallel ventilation passages 8 to the liquid in the microfluidic channel 2. As a result, the flowability of the liquid can be improved, resulting in improved liquid control performance.

The two passage side walls 9 having high stiffness can increase the stiffness of the two parallel ventilation passages 8 and the microfluidic channel 2 around the inlet 6. As a result, it is possible to reduce the deformation of the two parallel ventilation passages 8 and the microfluidic channel 2 and reduce the shape variation in the two parallel ventilation passages 8 and the microfluidic channel 2. It is possible to improve the shape accuracy of the two parallel ventilation passages 8 and the microfluidic channel 2, improve the accuracy of the measurement of the assay device performed using the passages, and also improve the liquid control performance.

In the assay device, the two passage side walls 9 can prevent the liquid that has just flowed into the microfluidic channel 2 through the inlet 6 from flowing out to the two parallel ventilation passages 8 from the microfluidic channel 2 due to its momentum. Thus, the liquid control performance can be improved.

In the assay device according to the embodiment, the lower member 20 defines the outer side portions 8*a* of the two parallel ventilation passages 8 in the width direction, and the two outer side portions 4*b* of the separating space 4 in the width direction.

In the assay device, the stiffness of the outer side portions 8*a* of the two parallel ventilation passages 8 and the two outer side portions 4*b* of the separating space 4 defined by the lower member, which is an integrally molded article, can be increased. As a result, it is possible to reduce the deformation of the two parallel ventilation passages 8 and the separating space 4 and reduce the shape variation in the two parallel ventilation passages 8 and the separating space 4. Thus, it is possible to maintain the shape accuracy of the two parallel ventilation passages 8 and the separating space 4 and the accuracy of the measurement of the assay device performed using the passages and space, and also improve the liquid control performance.

As the embodiment according to the present invention has been described in a nonrestrictive manner, the present invention may be varied and modified based on the technical concept.

REFERENCE SIGNS LIST

1 Assay module
2 Microfluidic channel
2*a* One end, Downstream end
2*b* Lower portion
2*c* The other end, Upstream end
2*d* Side edge
3 Absorbing porous medium, First absorbing porous medium
4 Separating space
4*a* Lower portion
4*b* Outer side portion
5 Housing space, First housing space
5*a* Lower portion
6 Inlet
6*a* Circumferential edge portion
7 Inflow channel
8 Parallel ventilation passage
8*a* Outer side portion
9 Passage side wall
20 Lower member

The invention claimed is:

1. An assay device comprising:

a microfluidic channel configured to allow liquid to flow;

an absorbing porous medium disposed at a distance from one end of the microfluidic channel, the one end being positioned on one side in a flow direction of the liquid;

two parallel ventilation passages, wherein each of the two parallel ventilation passages is adjacent to a respective side edge of the microfluidic channel in a width direction, the two parallel ventilation passages communicating with the microfluidic channel to allow air circulation;

a separating space disposed between the one end of the microfluidic channel and the absorbing porous medium; and a housing space connected to the separating space in the flow direction, the housing space housing the absorbing porous medium, wherein the assay device comprises a lower member that is an integrally molded article, the lower member positioned on a lower side of the assay device in a height direction and constituting a part of the assay device, wherein the lower member defines a lower portion of the microfluidic channel in the height direction, a lower portion of the separating space in the height direction, and a lower portion of the housing space in the height direction, wherein the lower portion of the separating space and the lower portion of the housing space are inclined downward toward the one side from another side in the flow direction of the liquid, and wherein the lower member supports the absorbing porous medium at the lower portion of the housing space, wherein the lower member defines outer side portions of the two parallel ventilation passages in the width direction, and both outer side portions of the separating space in the width direction, wherein the outer side portions of the two parallel ventilation passages and the outer side portions of the separating space extend upward from the lower portion of the microfluidic channel, wherein the outer side portions of the separating space have an end surface, wherein the absorbing porous medium is in contact with both outer side portions of the separating space in the flow direction at the end surface, wherein the housing space comprises a first housing space and a second housing space, wherein the second housing space is positioned downstream of the first housing space, wherein the lower portion of the first housing space is inclined, and wherein the lower portion of the second housing space is recessed downward in the height direction from the lower portion of the first housing space, and the absorbing porous medium within the first housing space is not positioned below the microfluidic channel in the height direction.

2. The assay device according to claim 1, further comprising:

an inlet disposed in another end of the microfluidic channel on the other side in the flow direction, the inlet allowing the liquid to be supplied to the microfluidic channel; and an inflow channel allowing the microfluidic channel and the inlet to communicate with each other in the flow direction, wherein the lower member defines a circumferential edge portion of the inlet, and the inflow channel is defined to penetrate through the circumferential edge portion of the inlet in the lower member.

3. The assay device according to claim 2, further comprising:

two passage side walls, each of the two passage side walls protruding along a part of one of the side edges of the microfluidic channel from the circumferential edge portion of the inlet in the flow direction, wherein the lower member defines the two passage side walls, and a height of the two passage side walls coincides with a height of the microfluidic channel.

4. The assay device according to claim 1, wherein the absorbing porous medium comprises a first absorbing porous medium and a second absorbing porous medium;

the second absorbing porous medium is positioned at the second housing space in contact with the lower portion of the second housing space;

a portion of the first absorbing porous medium on one side in the flow direction of the liquid is positioned at the second housing space in contact with the second absorbing porous medium and a portion of the first absorbing porous medium on another side in the flow direction of the liquid is positioned at the first housing space.

5. The assay device according to claim 4, wherein another side in the flow direction of the liquid of the second absorbing porous medium is in contact with the lower member.

* * * * *